United States Patent [19]

Barbe

[11] Patent Number: 5,290,341
[45] Date of Patent: Mar. 1, 1994

[54] FAST RESPONSE MEMBRANE GENERATOR USING HEAT ACCUMULATION

[75] Inventor: Christian Barbe, Fontenay aux Roses, France

[73] Assignee: L'Air Liquide, Societe Anonyme Pour l'Etude et l'Exploitation des Procedes Georges Claude, Paris Cedex, France

[21] Appl. No.: 935,165

[22] Filed: Aug. 26, 1992

[51] Int. Cl.$^5$ .............................................. B01D 53/22
[52] U.S. Cl. ............................................ 95/54; 95/288
[58] Field of Search ............... 55/16, 23, 68, 158, 55/208

[56] References Cited

U.S. PATENT DOCUMENTS

| | | | |
|---|---|---|---|
| 2,790,505 | 4/1957 | Dow | 55/179 X |
| 3,734,293 | 5/1973 | Biskis | 55/208 X |
| 4,698,073 | 10/1987 | Rohde et al. | 55/208 X |
| 4,787,919 | 11/1988 | Campbell et al. | 55/158 X |
| 4,881,953 | 11/1989 | Prasad et al. | 55/16 |
| 5,096,468 | 3/1992 | Minhas | 55/158 X |

*Primary Examiner*—Robert H. Spitzer
*Attorney, Agent, or Firm*—Oblon, Spivak, McClelland, Maier & Neustadt

[57] ABSTRACT

A membrane gas generator, which contains: a) a feed stream compressor having a feed stream input, b) a heat source downstream of the feed stream compressor, and in fluid connection therewith, c) a heat accumulator downstream of the heat source, and in fluid connection therewith; and d) at least one membrane with a permeate side and a non-permeate side downstream of the heat accumulator.

17 Claims, 2 Drawing Sheets

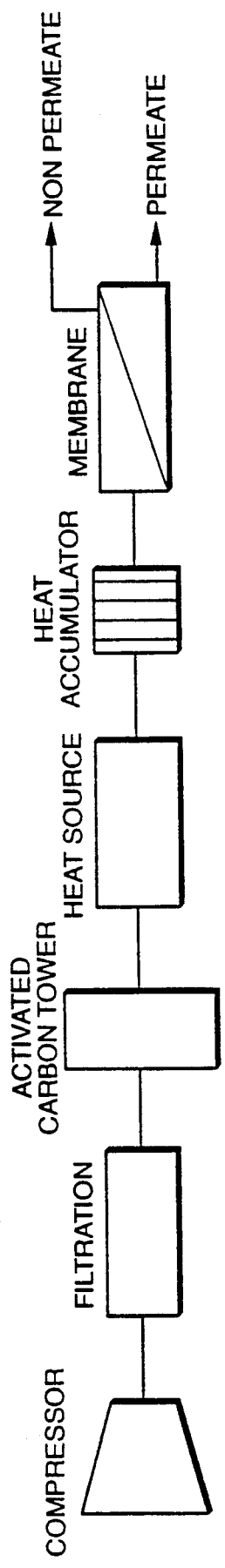
FIG._1
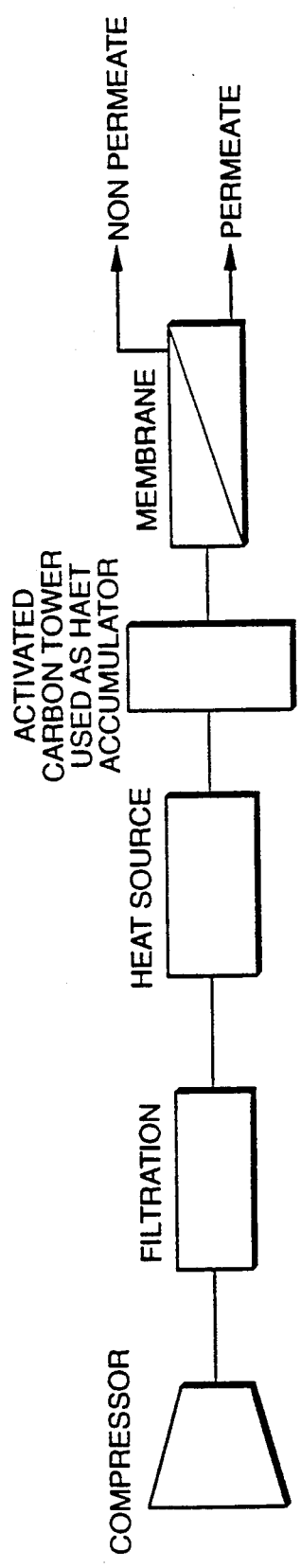
FIG._2

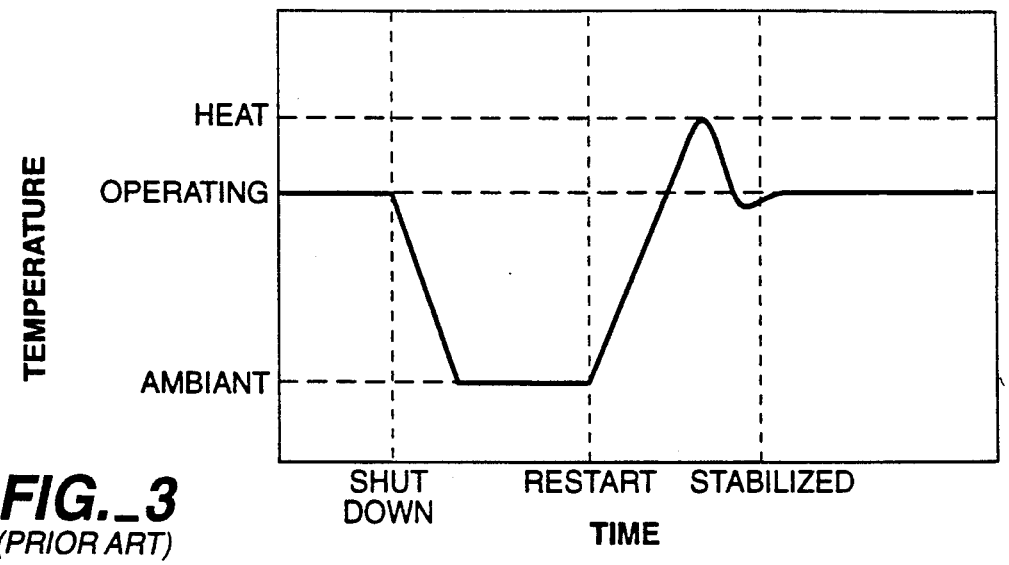
FIG._3
(PRIOR ART)
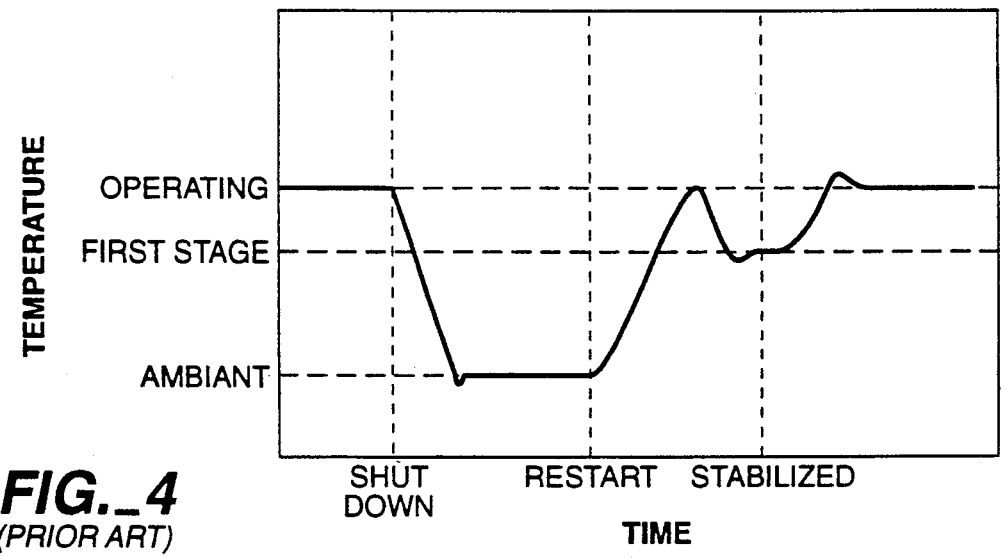
FIG._4
(PRIOR ART)
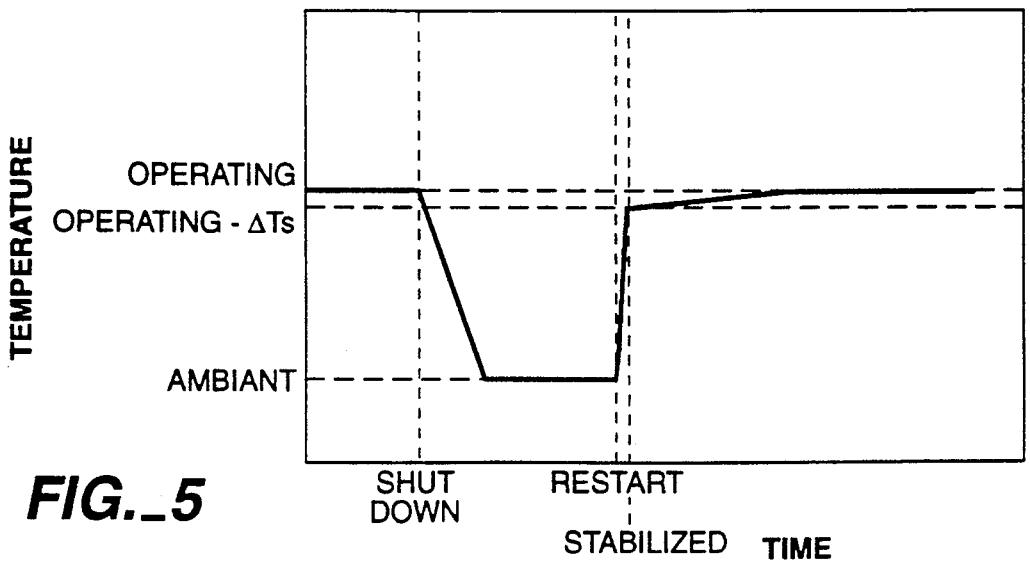
FIG._5

FAST RESPONSE MEMBRANE GENERATOR USING HEAT ACCUMULATION

BACKGROUND OF THE INVENTION

1. Field of the Invention

The present invention relates to a fast response membrane generator using heat accumulation.

2. Description of the Background

Membrane processes are presently used in a wide variety of gas separators. In such processes, the feed stream is brought into contact with the surface of the membrane with the more readily permeable component being recovered at low pressure, whereas the less readily permeable component is collected as a non-permeate stream at a pressure close to the feed pressure.

Membrane systems are increasingly employed, for example, for on-site production of nitrogen or other gases. In all such cases, the membrane generator is used in combination with a liquid nitrogen back-up tank that is used at start-up until the production reaches the required purity as requested by the customer, during peak demands or generator shutdown periods. Unfortunately, the efficiency of such membrane systems is reduced by variable customer demand over time. In particular, when the required flow rate decreases, the system is utilized only part-time so that stops and restarts are frequent. Furthermore, long-term shutdowns frequently occur due to required regular maintenance. Thus, liquid nitrogen must be vaporized at each restart to feed the customer line before the generator has reached the required level of purity. This vaporized liquid nitrogen is, in any case, more expensive than the nitrogen produced by the generator. Thus, there is a great need to reduce the consumption thereof to a minimum. It is also especially desired to reduce the start-up time to a minimum.

One of the limiting factors for reaching the required purity is the time required for the membranes to reach operating temperature when this temperature is above ambient temperature. In cases, where the membrane operating temperature is above ambient temperature, it is, therefore, necessary to be able to introduce a large quantity of heat into the system in a very short period of time, such as a few seconds. Unfortunately, at present, several minutes are required to reach operating temperature. Most of the time required to bring the system to operating temperature is due to the inertia of the heater, heating of the pipes and membranes that are cold.

At present, in order to reduce start-up time, a system has been proposed which uses an electrical gas heater on the feed pipe. Although very powerful heaters may be used, this amounts to over-design at excessive cost when compared to the power required merely to keep the system at operating temperature.

Another solution proposed is to maintain the entire system at the required temperature by maintaining a high ambient temperature. However, this turns out to be quite energetically expensive, particularly for long-term shutdown periods. Even if only the sensitive part, i.e., the membranes, are enclosed in a heated insulated box as in U.S. Pat. No. 4,787,919, the cost may still be high for long-term shutdown periods. Moreover, this does not improve the time necessary to heat the pipes and other equipment that is installed between the heater and the membranes. Further, if the air feed to the system is cold, the membranes will not work at optimum even if they are already at the operating temperature. Additionally, since the mass of the membrane is small compared to the feed flow rate, the system operates with the inefficiency of a cold system if the feed air is cold.

Thus, a need exists for a membrane generator system that can be restarted in a short amount of time, reaching operating temperature quite rapidly without any additional cost in energy or in investment.

SUMMARY OF THE INVENTION

Accordingly, it is an object of the present invention to provide a heat accumulator for a membrane gas generator that stores part of the heat provided by a heater during operation and which can restore heat immediately to feed air at start-up when large power is required and when the heater is started.

It is also an object of the present invention to provide a heat accumulator as part of a heat buffer for a membrane gas generator.

The above objects and others which will become more apparent in view of the following disclosure are provided by a membrane gas generator, which entails a) feed stream compressing means; b) heat source means in fluid connection with and downstream of the feed stream compressing means; c) heat accumulator means, in fluid connection with and downstream of the heat source means; and d) at least one membrane having permeate side and non-permeate side downstream of the heat accumulator means and being in fluid connection therewith.

BRIEF DESCRIPTION OF THE DRAWINGS

FIG. 1 illustrates heat accumulator means used in a membrane nitrogen generator between heat source means and the membrane in accordance with the present invention.

FIG. 2 illustrates the use of an activated carbon tower as heat accumulator means.

FIG. 3 illustrates different membrane feed gas temperature profiles as a function of apparatus used, where the temperature profile using the prior art methodology is shown.

FIG. 4 represents a temperature profile using the two-stage control of the prior art.

FIG. 5 represents a temperature profile obtained using the present invention.

DETAILED DESCRIPTION OF THE PREFERRED EMBODIMENTS

In accordance with the present invention, a membrane gas generator apparatus is provided which is capable of being restarted in a very short amount of time, and reaching operating temperature quite rapidly without any additional cost in energy or in investment.

The present invention also provides a heat accumulator means which is capable of storing a portion of the heat provided by heat source means during normal operation of the generator. Hence, the heat source means can be used to add a quantity of energy to the heat required to maintain the feed gas at a required temperature or an external heat source means may be used to compensate for the thermal losses in the accumulator. When the unit is restarted, the stored energy may be restored as the system will be cold after shutdown.

Further, in accordance with the present invention, the heat stored may prevent the membranes from overheating, acting as a heat buffer. This is particularly important when the operating temperature is close to the maximum temperature tolerated by the membranes.

While it is generally of practical benefit to operate a membrane at a relatively high temperature, there are practical considerations regarding the operating temperature which is used. These considerations may be due to the membrane, itself, the mechanical properties of which generally decrease when temperature increases, or they may be due to other construction materials used in the membrane module, e.g., tube-sheet material, baffle material or shell material.

For example, a nitrogen separation membrane may be constructed of polyimide with tube sheets made of epoxy. In this case, the epoxy material used for tube-sheet manufacture is the limiting factor for operation at elevated temperatures. In particular, such material loses a substantial portion of its mechanical properties at temperatures above 95° C. Generally, therefore, the maximum long term operating temperature for such a membrane is no more than about 80° C., to provide an adequate margin of safety.

Generally, in accordance with the present invention, a membrane gas generator is provided which contains feed stream compressing means having feed stream input means; heat source means downstream of the feed stream compressing means, and which is in fluid connection therewith; heat accumulator means downstream of the heat source means, and which is in fluid connection therewith; and at least one membrane with a permeate side and a non-permeate side downstream of the heat accumulator means.

In more detail, the heat accumulator means of the present invention may be any type of solid material having a sufficiently high specific heat. For example, brick or refractory materials may be used. The heat accumulator substance may also be activated carbon which can be used in a carbon tower, for example, in a process used to remove oil from feed air. See FIG. 2.

Generally, the activated carbon tower is used for two functions. The first function is for oil vapor removal through adsorption in activated carbon pores. The second function is to act as a heat accumulator, i.e. to be able to store heat energy through one of the means described above, and to deliver it to feed gas when necessary.

Any conventional solid material may be used having a specific heat which is sufficiently high to render the material susceptible to use in the heat accumulator means. Materials meeting such a level of specific heat are well known to those skilled in the art.

Generally, any material may be used which has a sufficiently high specific heat, low cost and good chemical stability. As examples, pebbles, brick or steel balls may be mentioned. However, any material meeting the general conditions described above may be used. For example, reference may be made by the artisan to the *Chemical Engineer's Handbook* (Perry & Chilton, 5th Edition).

Additionally, a heat accumulator material may be used which retains energy due to its inherent thermal inertia or it may require an additional heating supply to compensate for the losses during long-term, shutdown periods. The heat accumulator material may be inserted in an insulated shell alone or in an insulated shell that also contains the membranes.

As used herein, the term "inherent thermal inertia" refers to the fact that in some instances it may be unnecessary to add heat to the accumulator if during the period of observation heat loss to the outside of the accumulator is negligible compared to the heat stored initially in the accumulator.

The heat source means may be any conventional heat source, such as for example, an electrical heater or a heat exchanger using either an internal or an external energy source. Such heat source means are well known to those skilled in the art.

As used herein, the term "internal/external energy source" means that energy used is recovered within the generator. For example, it may be a partial recovery of the air compression energy. In practice, this can be performed using an air-oil heat exchanger on the oil circuit of a lubricated screw compressor. Further, the external energy source may be an outside electrical heater, or a steam heater or a hydrocarbon combuster, for example.

Those skilled in the art will appreciate that various changes and modifications can be made in the details of the invention without departing from the scope of the invention as set forth in the appended claims. Thus, the permeable membranes employed in the practice of the invention will commonly be employed in membrane assemblies typically positioned within enclosures to form a membrane module comprising the principal element of a membrane system. As understood with reference to the invention, a membrane system comprises a membrane module or a number of such modules, arranged for either parallel or series operation. The membrane modules can be constructed in convenient hollow fiber form, or in spiral wound, pleated flat sheet membrane assemblies, or in any other desired configuration. Membrane modules are contracted to have a feed air surface side and an opposite permeate gas exit side. For hollow fiber membranes, the feed air can be added either to the bore side or to the other surface side of the hollow fibers.

It will also be appreciated that the membrane material employed for the air separation membrane and for the hydrogen purification membrane can be any suitable material capable of selectively permeating a more readily permeable component of the feed gas, i.e., air or impure hydrogen. Cellulose derivatives, such as cellulose acetate, cellulose acetate butyrate and the like; polyamides and polyimides, including aryl polyamides and aryl polyimides; polysulfones; polystyrenes and the like, are representative of such materials. However, in accordance with the present invention, polyimides are preferred.

As indicated above, the permeable membranes comprising the membrane system positioned within the insulated enclosure of the invention may be in any desirable form, with hollow fiber membranes being generally preferred. It will be appreciated that the membrane material employed in any particular gas separation application can be any suitable material capable of selectively permeating a more readily permeable component of a gas or fluid mixture containing a less readily permeable component. Cellulose derivatives, such as cellulose acetate, cellulose acetate butyrate, and the like; polyamides and polyimides, including aryl polyamides and aryl polyimides; polysulfones; polystyrenes and the like, are representative examples of such materials. It will be understood in the art that numerous other permeable membrane materials are known in the art and suitable for use in a wide variety of separation operations. As noted, the membranes, as employed in the practice of the invention, may be in composite membrane form, in asymmetric form or in any such form that is useful and effective for the particular gas separation being carried out using the system and process of the invention.

The hollow fiber membranes are generally formed from a polymeric material which is capable of separating one or more fluids from one or more other fluids in a fluid mixture. The polymeric materials which may be used to prepare the hollow fiber membranes preferably include olefinic polymers, such as poly-4-methylpentene, polyethylene, and polypropylene; polytetrafluoroethylene; cellulosic esters, cellulose ethers and regenerated cellulose; polyamides; polyetherketones and polyetheretherketones; polyestercarbonates and polycarbonates, including ring substituted versions of bisphenol based polyestercarbonates and polycarbonates, polystyrenes; polysulfones; polyimides; polyethersulfones; and the like. The hollow fiber membranes may be homogeneous, symmetric (isotropic), asymmetric (anisotropic), or composite membranes. The membranes may have a dense discriminating region which separates one or more fluids from one or more other fluids based on differences in solubility and diffusivity of the fluids in the dense region of the membrane. Alternatively, the membranes may be microporous and separate one or more fluids from one or more other fluids based on relative volatilities of the fluids.

Hollow fiber membranes with dense regions are preferred for gas separations. Asymmetric hollow fiber membranes may have the discriminating region either on the outside of the hollow fiber, at the inside (lumen surface) of the hollow fiber, or located somewhere internal to both outside and inside hollow fiber membrane surfaces. In the embodiment wherein the discriminating region of the hollow fiber membrane is internal to both hollow fiber membrane surfaces, the inside (lumen) surface and the outside surface of the hollow fiber membrane are porous, yet the membrane demonstrates the ability to separate gases. In the embodiment wherein gases are separated, the preferred polymeric materials for membranes include polyestercarbonates, polysulfones, polyethersulfones, polyimides, and polycarbonates. More preferred polymeric materials for gas separation membranes include polycarbonates and polyestercarbonates. Preferred polycarbonate and polyestercarbonate membranes for gas separation include those described in U.S. Pat. Nos. 4,874,401, 4,851,014, 4,840,646, and 4,818,254; the relevant portions of each patent incorporated herein by reference for all legal purposes which may be served thereby. In one preferred embodiment, such membranes are prepared by the process described in U.S. Pat. No. 4,772,392, the relevant portions incorporated herein by reference for all legal purposes which may be served thereby.

Having described the present invention, reference will now be made to certain examples which are provided solely for purposes of illustration and are not intended to be limitative.

EXAMPLE 1:

Accumulator Design

If, for example, the generator feed flow rate is 100 Nm³/h and the temperature of which must be increased from 20° C. (ambient temperature) to 40° C. (operating temperature), the electrical heater is designed as follows:

POWER = $(F_{air} * \Delta T\ C_{pair})$ + thermal loss

Where:
$F_{air}$ = air flow rate = 100 Nm³/h
$\Delta T$ = temperature variation to bring to the gas = 40 − 20 = 20° C.
$C_{pair}$ = air specific heat = 0.25 cal/g.° C.

Therefore: POWER > 0.75 kV

However, the time required to heat all the pipes and system before reaching the equilibrium is around 10 minutes. Most of the power available from the electrical heater is used to heat the system and not to heat the feed air. In that case, the extra energy required by the system to complement the feed air heating during the 10 minutes lap is:

$E = (F_{air} * \Delta T * C_{pair}) *$ Time
$E = 450$ kJ

This energy may be provided by the present heat storage system. It must be designed so that:

$$E = M_s * C_{ps} * \Delta T_s$$

Where:
$M_s$ = accumulator mass
$C_{ps}$ = accumulator specific heat
$\Delta T_s$ = accumulator temperature variation It can reasonably be assumed that the heat transfer between the accumulator and the feed air is ideal, i.e., that the air temperature and the accumulator temperature are equal.

Further, it is acceptable to feed the membranes with a gas temperature slightly lower than 40° C.; for example, 38° C. would still be acceptable.

Therefore:
$\Delta T_s = 40 - 38 = 2°$ C.
$E = 450$ kJ $= (M_s * C_{ps}) * 2$

This may be achieved with:

80 liters of magnesite brick ($C_{ps} = 0.93$ J/g.° C., density = 3000 kg/m³) or with 110 liters of stones ($C_{ps} = 0.84$ J/g.° C., density = 2500 kg/m³) or with 400 liters of activated carbon in the case of scheme 2 ($C_{ps} = 1.05$ J/g.° C., density = 500 kg/m³).

The required volumes are very compatible with the size of practical units. The accumulator material may also be a material that has a phase transition at the operating temperature. Such a material would then restore the energy stored in the high temperature phase without any change of temperature ($\Delta T_s = 0$) which is optimized.

The stabilization time for a membrane generator would then decrease from 10 minutes to less than 1 minute, reducing the liquid nitrogen vaporized to a minimum. In the absence of peak demands supplied by liquid nitrogen, the consumption will be reduced by a factor of 10. If only 50% of the liquid nitrogen is due to start-up time supply, the global liquid consumption will drop to 55% of its previous value.

EXAMPLE 2

Protection from Overheating

In accordance with the present invention, it is also possible to adjust the heating control parameter in order to decrease the stabilization time from 10 minutes to 5 minutes for example. However, in such a case, there is a risk of overheating the membranes. This is represented in FIG. 3. This is especially undesirable when the operating temperature is close to the maximum tolerated temperature.

Using a conventional methodology, a two-stage control system is used to prevent the membranes from overheating, where the temperature is brought to the operating temperature minus 5° C. if we expect the overheating to be around 5° C. When the first plateau is reached, then the control system may switch to a second step to reach slowly the operating temperature. In any case, that solution does protect the membranes from overheating, but the stabilization time may then be very long.

By contrast, in accordance with the present invention, the accumulator can also be used as a heat buffer, so that the temperature seen by the membranes is almost constant. This is represented in FIG. 5. The conventional double-staged control system is, thus, unnecessary and the time at start up is reduced while a good protection is provided against overheating.

Finally, in order to more fully explain the advantages of the present invention reference will now be made to each of the Figures in detail.

FIG. 1 illustrates the use of and positioning of the heat accumulator means in accordance with the present invention.

FIG. 2 illustrates an activated carbon tower used as a heat accumulator or storage means in accordance with the present invention.

FIG. 3 illustrates different membrane feed gas temperature profiles, where a temperature profile is shown using the prior art methodology.

FIG. 4 represents a temperature profile using the two- o stage control of the prior art.

FIG. 5 represents a temperature profile obtained using the present invention.

Generally, in accordance with the present invention any membrane or membranes may be used which are conventionally used for gas separation. For example, mention may be made of polyimides, polycarbonates, poly(phenylene oxide), nylon-6,6, polystyrene and cellulose acetate. In fact, any one or combination of these membranes may be used where more than one membrane is used. However, in accordance with the present invention, it is particularly advantageous to use one or more polyimide membranes at relatively high temperatures.

Further, in accordance with the present invention, it is advantageous to reheat the feed air or the feed air line after compression, before the membrane inlet. It is preferred, however, that the feed air be reheated at a location which is in close proximity or near to the membrane module(s) inlet(s).

By reheating the feed air at a location which is in close proximity to or near the membrane module inlet(s), a better control of air temperature is maintained, regardless of outside conditions. Further, with such an arrangement, heat consumption may be minimized.

Generally, it is desirable to reduce the conduit distance between the heater and the module inlet(s). More particularly, it is preferable to use as short of a length of pipe as possible between the heater and the module inlet(s). In general, the distance is close enough to the membrane inlet(s) for outside temperature variations to have a negligible effect on feed air temperature at the module inlet(s). By "negligible effect" is generally meant that the temperature fluctuations are under +1° C.

In accordance with the present invention, individual components used may each be conventional, such as compressing means, filtration means, heat source and membrane means. However, the incorporation of the present heat accumulator means into the membrane gas generator of the present invention affords an integrated system having surprisingly advantageous features. Further, the ability of the present generator to rapidly restart in a highly efficient manner, itself, affords a surprisingly effective method of use therefor.

Furthermore, in accordance with the present invention a feed air heater is generally employed. However, one or more additional heating means may also be used.

For example, it is advantageous to employ heating means, such as a heater, which is integrated into the heat accumulator, itself, independent of the feed air heater and in addition to it. Generally, such additional heating means may be controlled by a temperature sensor located in the heat storage material, and heat may be added whenever the heat storage material temperature falls under a preset level.

Having described the present invention, it will now be apparent to one of ordinary skill in the art that many changes and modifications may be made without departing from the spirit and the scope of the present invention.

What is claimed as new and desired to be secured by Letters Patent of the United States is:

1. A method of rapidly restarting a membrane nitrogen generator which is operated non-continuously, thereby reaching operating temperature in a reduced amount of time, said generator comprising feed stream compressing means having feed stream input means; heat source means downstream of said feed stream compressing means, and in fluid connection therewith; heat accumulator means downstream of said heat source means, and in fluid connection therewith; and at least one membrane with a permeate side and a non-permeate side downstream of said heat accumulator means; said method, comprising:

a) storing a portion of heat provided by said heat source means during operation of the generator in said heat accumulator, and b) restoring heat to the generator from said heat accumulator means after said generator has been down and upon restarting said generator.

2. The method of claim 1, wherein said heat is restored to a compressed gas stream delivered by the compressing means.

3. The method of claim 1, wherein said heat is restored to said at least one membrane.

4. The method of claim 3, wherein said at least one membrane is operated at a temperature which is near maximum temperature tolerated by the at least one membrane.

5. The method of claim 1, wherein said heat source means is one using either an internal or external energy source.

6. The method of claim 5, wherein said internal energy source obtains energy from a partial recovery of air compression energy.

7. The method of claim 5, wherein said external energy source is an electrical heater, steam heater or hydrocarbon combuster.

8. The method of claim 1, wherein said heat accumulator means comprises a material having a specific heat which is sufficiently high to enable said material to accumulate and retain heat.

9. The method of claim 1, wherein said heat accumulator means comprises a material having an inherent thermal inertia sufficient to accumulate and retain heat.

10. The method of claim 1, wherein said heat accumulator means is contained, by itself, in an insulated shell or is contained in an insulated shell also containing said at least one membrane.

11. The method of claim 1, wherein said heat accumulator means satisfies the following equation:

$$E = M_s \cdot C_{ps} \cdot \Delta T_s$$

wherein E is the required energy input, M is the accumulator mass, Cps is the accumulator specific heat and $\Delta T_s$ is the temperature variation of the heat accumulator.

12. The method of claim 1, wherein said at least one membrane is made of a material selected from the group consisting of polyimide, polycarbonate, poly(phenylene oxide), nylon-6,6 polystyrene and cellulose acetate.

13. The method of claim 1, wherein said at least one membrane is a polyimide membrane.

14. The method of claim 1, which further comprises heating means proximate to an inlet for said at least one membrane, which is in a module, for reheating feed air.

15. The method of claim 14, wherein said heating means is positioned relative to said membrane module inlet(s) such that outside temperature variations cause a temperature fluctuation of less than +1° C. on feed air temperature.

16. The method of claim 1, which further comprises one or more additional heating means, which heating means is integrated into the heat accumulator, and is independent of the heat source means downstream of said feed stream compressing means.

17. The method of claim 16, wherein said heating means integrated into said heat accumulator is controlled by a temperature sensor located in the heat accumulator.

* * * * *

UNITED STATES PATENT AND TRADEMARK OFFICE
CERTIFICATE OF CORRECTION

PATENT NO. : 5,290,341

DATED : March 1, 1994

INVENTOR(S) : Christian Barbe

It is certified that error appears in the above-identified patent and that said Letters Patent is hereby corrected as shown below:

Column 6, line 47, delete "$(\Delta T,=0)$" and insert --$(\Delta T_s=0)$--.

Column 7, line 31, delete "two-o stage" and insert --two-stage--.

Signed and Sealed this

Sixteenth Day of April, 1996

*Attest:*

BRUCE LEHMAN

*Attesting Officer*   Commissioner of Patents and Trademarks